Patented July 14, 1942

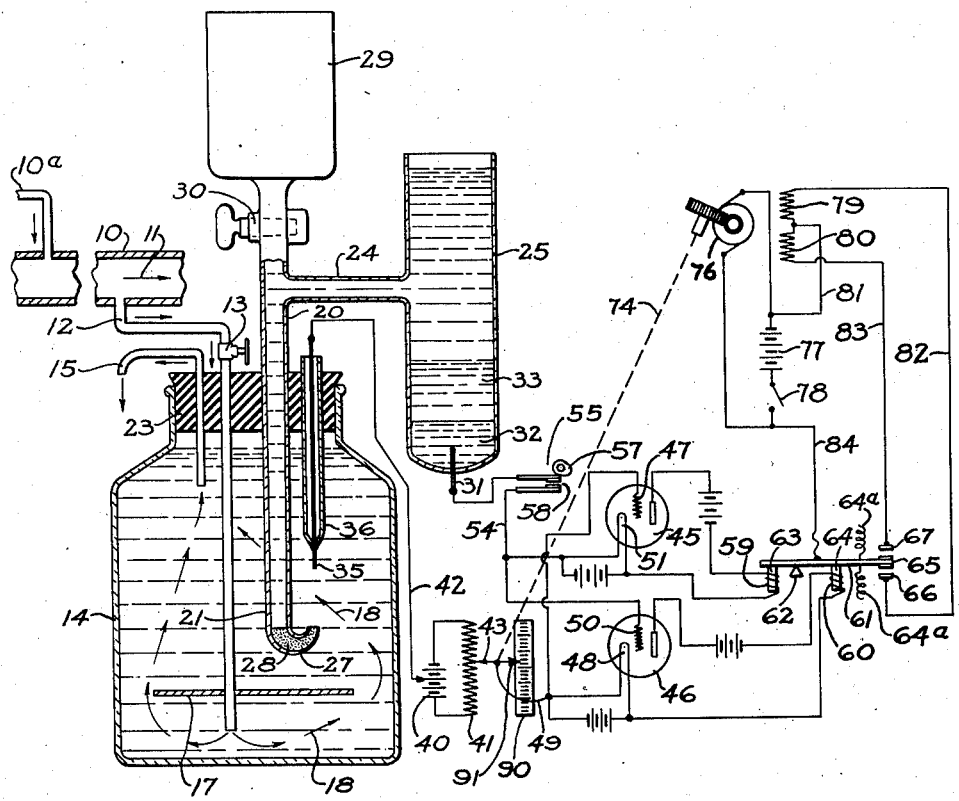

2,289,589

UNITED STATES PATENT OFFICE 2,289,589

TREATMENT OF AQUEOUS LIQUIDS WITH HALOGENS

Richard Pomeroy, Harbor City, Calif., assignor to Wallace & Tiernan Co. Inc., Belleville, N. J., a corporation of New York Application April 10, 1939, Serial No. 267,005

9 Claims. (Cl. 210—28)

This invention relates to the treatment of aqueous liquids with halogens (including halogen compounds, as hereinafter defined). More specifically it relates to the treatment of aqueous materials, notably sewage and water containing undesirable substances, with chlorine and has for its purpose to provide new methods of such treatments. Hydrogen sulphide is the constituent which most commonly gives rise to the objectionable odor of sewage. Also, whenever hydrogen sulphide is present a condition is set up which may result in very serious corrosion of the materials from which sewers are commonly constructed, this corrosion commonly going so far that it results in causing the sewers to collapse. In certain drinking water sulphides are found which are extremely objectionable to the consumer and my method is adaptable to the elimination of such undesirable characteristics.

My invention is based upon my discovery that if the electrode potential of the aqueous material being treated is held within certain limits (which I have found to be readily determinable, as hereinafter explained), difficulties from odors of hydrogen sulphide and corrosion caused therefrom will be eliminated. The treatment consists in the addition of halogens, and I have discovered that after treatment the electrode potential will indicate the effect of such added halogen in ranges below those detectible by ordinary methods of chemical analysis.

An example of my new method of treatment comprises the addition of chlorine to the liquid undergoing treatment, the chlorine being added in sufficient quantity to produce the desired result, notably substantial elimination of hydrogen sulphide ($H_2S$) and the conditioning of the liquid to such a state that hydrogen sulphide is not present, but in which the chlorine is added in much less quantity than would be required if free chlorine were present after treatment and also in much less quantity than would be required to have chlorine present in such amounts that it could be detected by ordinary methods of chemical analysis. The desired effect or result is detected by the electrode potential of the treated liquid with respect to a reference electrode, the potential of which is constant and independent of the trated liquid, and the difference of potential so detected may be utilized for maintaining the desired effect by manually or automatically controlling the addition of the chlorine when and as needed.

One of the most important new results accomplished by my method is the marked reduction in the amount of chlorine required to produce the desired result in a variety of fields of application. More generally stated, certain major objects of my invention may be summarized as follows: (1) to treat sewage in such a manner that its nuisance properties are eliminated at the lowest possible cost; (2) to treat water in such a manner as to eliminate undesirable substances such as sulphides and bring the water to a predetermined state of reconditioning at minimum cost; and (3) to eliminate or prevent the formation of gases or substances which are injurious to the materials from which sewers may be constructed. Among these gases may be mentioned hydrogen sulphide and sulphur dioxide.

For convenience of explanation I shall first describe the method as applied to the treatment of sewage, and by describing what I now consider to be a preferred form of apparatus for practicing this method.

Referring to the drawing, which illustrates the apparatus, a pipe 10 or other conduit is provided for handling the flow of sewage, for example in the direction indicated by the arrow 11. For detection of its electrode potential, the sewage may be conveniently sampled, for instance by continuously withdrawing a small portion of it through a pipe 12. The addition of chlorine to the sewage may be advantageously effected at a point in the stream ahead of the sampling line 12; for example, through the line 10a from a suitably controllable source of supply, not shown. Such source of supply may comprise a chlorinator or other feeding apparatus, as of types known in the art. It will be understood that the sedimentation basins, filters or like sewage treating equipment may be employed, if desired, in conjunction with the apparatus shown; indeed, for instance, the sampling of sewage through the pipe 12 may be withdrawn from a sedimentation basin through which the sewage is flowing, rather than from a simple conduit.

Although the electrode potential of the sewage may in some cases be detected in the main stream of sewage, a small sample of the main flow is preferably withdrawn through the pipe 12 including a valve 13 and thus passes into a container 14, the excess liquid being discharged through a pipe 15. The liquid discharged through the pipe 15 may be discarded or may be returned to the pipe 10 by the use of any well-known means. The pipe 12 is advantageously of such length as to introduce the sampled sewage into the bottom portion of the container, as shown, and if desired, a baffle 17 may be installed in the container so that the sewage discharged in the lower end thereof moves outwardly around this baffle and upward in the container as indicated by the arrows 18.

An electro-chemical half-cell 20 is associated with the liquid in the container 14 and may provide a tube 21 extending into the liquid through a plug 23 closing the upper end of the container. In the form illustrated, this half-cell is of the calomel type and includes a pipe 24 connecting the interior of the tube 21 with a reservoir 25 which may be open at its upper end, as shown. In such a calomel half-cell, the upper end of the reservoir 25, the pipe 24, and the tube 21 may contain an electrolyte, usually a chloride solution such as a solution of potassium chloride. In such a half-cell, this electrolyte forms a salt bridge and should be in ionic communication with the liquid (e. g., sewage) in the container 14. If desired, the electrolyte may be in direct communication with this liquid through a gooseneck 27 at the lower end of the tube 21. In some instances, it is desirable to use a gelatinous plug 28 in this gooseneck to prevent physical contact between the liquid in the container 14 and the electrolyte, but to permit the passage of ions therethrough, thus preventing excessive contamination or escape of the electrolyte. Such a plug may be formed in various ways, as by the use of any gelatinous substance, such as agar saturated with potassium chloride, though it will be understood that this plug may be omitted in some cases. It is sometimes desirable, especially when the gelatinous plug 28 is not utilized, to use a supply reservoir 29 containing additional quantities of the electrolyte and communicating with the tube 21 through a stop-cock 30. This permits addition of the electrolyte or periodical renewal thereof.

The half-cell 20 also provides a wire 31 serving as an electrical conductor, this wire being shown sealed in the bottom wall of the reservoir 25. A body of mercury 32 is in electrical contact with the wire 31 and serves as the electrode of the half-cell 20. In the reservoir 25 above the mercury 32, and saturated with the electrolyte, is a body of calomel (mercurous chloride) 33. This body of calomel, together with the mercury and the chloride solution serving as an electrolyte, forms a combination of substances which may undergo chemical change with ionic flow through the half-cell. Thus, the chloride solution may react with the mercury of the electrode forming calomel, this chemical reaction being a reversible one, depending upon the direction of flow of the electrons. In practice, this body 33, instead of being pure calomel, may comprise a mixture of mercury, calomel, and potassium chloride.

An electrode 35 extends into the liquid in the container 14 and may be sealed in a tube 36 extending through the plug 23, as shown. This electrode may be of any suitable material, preferably one which does not materially react with the sewage or like liquid in the container 14. Electrodes of platinum or gold are very satisfactory though other materials can be utilized in this regard. Preferably, the electrode 35 is spaced from the gooseneck 27 and is either directly or indirectly laved by the incoming sewage.

The half-cell 20 and the electrode 35 cooperate in defining an electro-chemical cell that generates a potential difference which varies in magnitude with certain conditions in the sewage, and which may be indicative, I have found, of a condition in the sewage where hydrogen sulphide (or for example, like odor-forming soluble sulphide) is absent. That is, when the electrode potential of the sewage, which may be detected as just described, reaches a definite and readily predeterminable zone, the result, I have now found, is a positive indication of the absence of the undesired sulphides; and the detection is not, for example, a detection of the concentration of chlorine in the sewage—indeed, the detection is effected in a zone of electrode potential which is, according to my present discovery, substantially below any electrode potential which would be representative of a concentration of chlorine (i. e., a concentration measurable in parts, or fraction of a part, per million).

The potential difference generated by this electro-chemical cell is determined, as above explained, by the composition of the solutions which are in contact with the electrodes 32 and 35. In effect, the electrode 32 serves as a datum, being in contact with a solution of substantially constant composition, such, for instance, as the potassium chloride solution saturated with calomel. The use of such a datum accordingly affords a convenient and accurate means for carrying out my method.

Any suitable means may be used for indicating the electrode potential, as may be detected by the half cell. In the embodiment shown I prefer to apply the electrode potential developed by the cell in normally balanced opposition to a standard source of potential, whereupon any variation in the said potential of the cell results in a potential unbalance in the control circuit. Means are provided in response to such unbalance for operating, for example, an indicating device, and also for adjusting the comparison source of potential so as to restore balance.

Such a system is shown in the accompanying drawing as utilizing a battery 40 or other source of unidirectional potential shunted by a relatively high resistance 41 and connected by a conductor 42 to the electrode 35. The resistance 41 conveniently comprises a potentiometer, for example of the slide wire type having an adjustable contact 43. It will now be understood that if the battery 40 is connected, as shown, so that it may always be susceptible of opposition to the potential developed by the cell, the contact 43 may be adjusted to a position of balance, i. e., a position wherein the voltage of the battery as proportioned by the potentiometer is equal and opposite to the voltage of the cell.

Suitable means are provided for operating an indicating device in response to voltage unbalance between the cell and the potentiometer output, and also for readjusting the potentiometer contact to follow up the changes in cell potential and thus to balance the input circuit. Although other types of circuit, also preferably including amplifying means, may be employed, the illustrated system includes two vacuum tubes 45 and 46, connected as follows. To a grid 47 of the former, and to a filament 48 of the latter, may be connected the adjustable contact 43, this being accomplished by a conductor 49. A grid 50 of the vacuum tube 46 and a filament 51 of the vacuum tube 45 may be interconnected, as shown, and connected to the mercury electrode 32 by a conductor 54. An intermittently-operated switch means 55 may be included in this conductor and may also include a suitably driven cam 57 periodically closing a switch 58.

Thus, when the electrode potential of the sewage departs from the value for which balance has existed in the input circuit (e. g., a value in the desired zone, as herein explained), the grid of one tube will be positive, thus increasing the plate current of one of the tubes. At the same time the filament of the other vacuum tube will be positively charged relative to the grid of that tube, thus tending to decrease the plate current in that tube. On the other hand, if the electrode potential varies in the opposite direction from its previous value, these conditions will be reversed. It is thus clear that the plate currents of the tubes 45 and 46 can be used for control purposes, as to effect balance restoring adjustment of the potentiometer and operation of a suitable indicating device or the like. To that end, I have shown a solenoid winding 59 in the plate circuit of the tube 45 and a solenoid winding 60 in the plate circuit of the tube 46.

Various means may be used for operatively connecting the solenoid windings with the balance restoring and indicating apparatus. One method of so doing includes the use of a relay including an arm 61 pivoted at 62 and carrying cores 63 and 64 which are respectively moved downward upon energization of the solenoid windings 59 and 60. Small springs 64a may be used, if desired, to assist in returning the arm 61 to neutral position. The arm 61 carries a contact 65 engageable with a contact 66 when the arm is moved in a clockwise direction, and engageable with a contact 67 when the arm is moved in an anti-clockwise direction. Thus, when the plate currents are equal, the pull exerted by each solenoid winding will be equal. This will be the condition when there is no change in the electrode potential of the sewage or like liquid. If, however, the electrode potential changes, more current will flow through one of the solenoid windings than the other, thus resulting in engagement between the contact 65 and one or the other, as the case may be, of the contacts 66 or 67.

Any suitable means may be used for operating the potentiometer contact 43 to restore balance. For example, there is shown a motor 76, arranged through suitable mechanical connection diagrammatically indicated by the dotted line 74, to displace the contact 43 in one direction or the other accordingly as the motor is caused to rotate one way or the other. In the embodiment illustrated, a direct-current motor is utilized, the armature being connected across a source 77, a switch 78 being provided if desired. A double-wound field is used including windings 79 and 80, one end of each winding being interconnected and connected to one terminal of the source 77 by conductor 81. The other terminal of the winding 79 is connected by a conductor 82 to the switch contact 66. Similarly, the other terminal of the winding 80 is connected by a conductor 83 to the switch contact 67. The arm 61 is connected to the source 77 through a conductor 84 and through the switch 78.

Thus, when the arm 61 moves to bring the contacts 65 and 66 into engagement, current flows through one of the field windings while, when this arm moves to close the contacts 65 and 67, the other of the field windings is energized.

It will be understood that the field windings are so disposed that the armature of the motor will be rotated in one direction or the other according as one or the other of the windings is energized. It will thus be apparent that when the electrode potential detected by the cell decreases, the motor 76 will rotate in such direction as to decrease correspondingly the potential between the contact 43 and conductor 42, i. e., by adjustment of the contact 43 upwards as seen in the drawing; and vice versa, if the electrode potential increases, the motor will adjust the contact arm in the opposite direction. In either case, the contact arm 43 is thus adjusted by the motor so as to restore balance in the input circuit, leaving the contact 43 in a changed position representative of the changed electrode potential.

By intermittent closing of the switch 58 the electrode potential of the sewage is tested only at intervals, thus effecting a saving in current and prolonging the life of the apparatus. In other instances, however, it is possible to dispense with this switch.

If desired, special means may be employed to control the amount of operation of the motor 76 once the contact 65 engages either of the contacts 66 or 67; or an auxiliary device may be used which allows the motor to operate for a predetermined length of time. It will be understood, however, that the shape of the cam 57, as well as the speed of rotation thereof, will control this factor if an intermittent energization system is used. Further, any suitable means, not shown, may be used for controlling the frequency of operation of the switch 58. In addition, suitable rheostats, potentiometers, etc., may be used in the vacuum tube circuits to control the amplification thereof and to balance these tubes, if desired.

For conveniently carrying out the method of my invention, suitable indicating means may be provided to indicate the electrode potential of the sewage as detected by the cell. One such means, as shown, may comprise a pointer 91 mechanically operated with or by the contact 43 (under control of the motor 76) and adapted to move over a suitable scale 90. In lieu of the pointer 91 and scale 90, other suitable indicating means may be arranged for operation by the system illustrated, i. e., actuated by rotation of the motor 76, and may include recording or indicating devices of well-known types.

It will now be seen that the procedure may be conveniently as follows: As the sewage, for example, advances along the pipe 10, its electrode potential is detected by the described system, and variations of that potential are accurately registered on the indicator 90—91. As will be appreciated, particularly in the light of what is elsewhere said herein, the electrode potential range in which it is desired to maintain the sewage—as positively representing a condition wherein objectionable sulphide, for example, is absent (and being, in my method, an electrode potential zone definitely less and preferably much less than electrode potentials which would be obtained when there is in the sewage a concentration of chlorine detectible by such electrometric means)—may be readily predetermined upon the scale 90. Accordingly, the operator or attendant observes the indicator from time to time and adjusts the supply of chlorine (introduced through the pipe 10a) in order to keep the pointer 91 within the predetermined optimum range on the scale. Thus if the indicated electrode potential starts to decrease, the operator adjusts the feeding apparatus so as to increase the quantity of chlorine, and vice versa—whereby the amount of chlorine is economically maintained at a minimum necessary for its use to obtain the desired condition of the sewage. Indeed, at certain times in some installations, the condition of the sewage may be such as not to require the addition of any chlorine at all; under such circumstances, it will be readily appreciated that the pointer 91 will stand in the predetermined optimum zone when the supply of chlorine has been completely shut off. If subsequently the condition of the sewage becomes less satisfactory, to a point where the detected electrode potential is less than the desired zone, the operator may then re-establish the supply of chlorine, as needed.

It will be understood that in some cases, direct mechanical, telemetric or other connection may be effected intermediate the output of the cell and the control element of the chlorinator or other feeding device, whereby the latter is automatically adjusted in accordance with variations of the electrode potential from the optimum zone. Devices suitable for such automatic control are available in various forms, as will now be appreciated by those familiar with the art, and such devices are therefore not here illustrated or described in detail. For example, the motor 76 may be arranged, through appropriate mechanical connection, to operate a control valve or other controlling instrumentality for varying the rate of feed of a chlorinator or the like connected to the line 10a.

It will now be seen that the invention affords a highly economical procedure for the treatment of sewage, in that instead of adding relatively large quantities of chlorine to provide in the treated sewage free chlorine detectible by ordinary methods of chemical analysis (or detectible as an electrode potential representative of chlorine content—i. e., indicating concentration of chlorine), only so much chlorine need be added, if any, as to reach the optimum zone of electrode potential. Electrolytic cell apparatus suitable for detection of electrode potential, in carrying out my method as hereinabove described, is also disclosed in my United States Patent #2,076,964, issued April 13, 1937, for Process and apparatus for water purification; although (as will now be understood) such cell, when used in practicing my present method, is utilized, and the associated apparatus is operated, in a different manner from that specifically disclosed in my said patent. It will be further understood that the structure of the cell and its various parts (including the half-cell and the structure and arrangement of the electrodes within the container 14) may be modified in various respects—for example, as set forth in my cited patent, particularly in the descriptive portion thereof beginning at line 60, second column, page 3, and extending through line 21, first column, page 4.

Although my present method finds its chief application in the treatment of sewage, particularly in sewage disposal plants, the disclosed procedure may be applied efficiently to other uses, such as hereinabove recited. Thus, for instance, the procedure may be applied to control the elimination of hydrogen sulphide content in water.

Although I have chiefly described my invention as relating to the elimination of hydrogen sulphide, it will be understood that the procedure is likewise applicable to the elimination of other objectionable sulphides, particularly odor-forming, soluble sulphides; indeed, the aqueous material under treatment may contain a plurality of sulphides (including hydrogen sulphide) and the desired results of sulphide elimination are readily attained simply by carrying out the described procedure.

It will be understood that throughout this application and in the appended claims, I have employed the term "halogen" to mean not only elementary halogens but also those halogen compounds which are able to liberate either elementary halogen or hypohalous acids. These compounds include the hypohalous acids and their salts and N-halogen compounds, important members of which group are the chloramines. The described class of halogen compounds, i. e., those able to liberate elementary halogen or hypohalous acids, will be readily understood by those familiar with the art.

By electrode potential as referred to herein is meant the potential as may be indicated by reading the voltage between an electrode immersed in the liquid being treated and the electrode of a standard calomel half-cell, the calomel half-cell being connected with the liquid being treated by means of a salt bridge or other means of ionic communication. It is recognized that this potential difference will not be the same with various types of electrodes used in the liquid being treated. While the potentials as referred to herein were obtained by using a bright gold or platinum wire electrode in the liquid being treated and a standard saturated calomel half-cell, it is understood that corresponding readings of different amounts would be obtained were other electrodes used, and such readings once obtained would be of equal significance. It will be further understood that other half-cells may be employed (for example as explained in my Patent No. 2,076,964) as well as other electrodes; indeed in any case, it will be appreciated that if desired for purposes of calibration or initial setting, the detected potentials may be easily corrected in the usual manner known to those skilled in the art, so as to obtain the effective potential between an electrode and the so-called normal hydrogen half-cell.

As heretofore explained, the method comprises the maintenance of the sewage, as by the addition of chlorine when necessary, within a pre-determinable optimum range of electrode potentials, corresponding to the point where hydrogen sulphide is eliminated. It will now be appreciated that this optimum range of electrode potentials may be readily predetermined for a given set of conditions or for a given installation wherein the method is to be practiced. For example, in using a cell of the type hereinabove specifically described, (employing a noble metal electrode, such as bright platinum or gold wire in contact with the sewage) and correcting the detected electrode potential of the cell to the equivalent of a cell employing the so-called normal hydrogen electrode—in accordance with the present standard practice of the art of electrometric determination—the optimum range of electrode potentials for elimination of sulphide difficulties as herein elsewhere explained, was found to fall within a range between about −150 millivolts and about +400 millivolts—determinations of this character having been specifically made with sewage at Los Angeles County, California, as obtained in the sewage system of the Los Angeles County Sanitation Districts.

In general, the optimum zone for a given sewage will be found to lie within the limits just stated, so far as most sewages or most localities are concerned; in the usual case, the actual optimum zone or range extends between considerably closer voltage values than the aforesaid limits—the position of the actual optimum zone within those limits varying considerably with the locality of the sewage. In any case, however, it will be understood, that the optimum range for liquid of any given general character, such as sewage in a given specific locality, may be readily determined by simple and rapid tests. In other words, variations from the stated range of electrode potentials occasioned by differences in cell construction or by differences in the general character of the sewage or other liquid being corrected for sulphide difficulties, or otherwise occasioned, may be readily ascertained at the outset; and thereafter the practice of the invention is effected by control to maintain the detected electrode potential within the range thus determined.

It will be understood that the invention is not limited to the specific embodiments or apparatus herein shown and described, but may be carried out in other ways without departure from its spirit as defined by the following claims.

I claim:

1. The method of treating aqueous material to eliminate undesired offensive odor-producing characteristics thereof, which method comprises in combination, detecting the electrode potential of the treated material with respect to a standard reference potential, and adding a halogen to the material when and as required to maintain the detected potential of the treated material below the minimum potential which would be detected if free chlorine were present in the material but above the maximum potential detected in the material when the undesired characteristic is present.

2. The method of testing aqueous material to determine undesired offensive odor-producing characteristics thereof, which method comprises in combination, treating the material with a halogen to reduce said characteristics, detecting the electrode potential of the material undergoing treatment with respect to a standard reference potential and translating the detected potential into an indication when said electrode potential departs from a value below the minimum electrode potential which would be detected if free chlorine were present in the material but above the maximum electrode potential detectable in the material when the undesired characteristic is present.

3. A method of treating sewage to eliminate undesired sulphur compounds which are susceptible of elimination by addition of chlorine, comprising subjecting the sewage to electrical test to determine the electrode potential thereof, with respect to a standard reference half-cell, supplying chlorine to the sewage at a point ahead of said electrical test, and adjusting the supply of said chlorine to maintain the detected electrode potential of the sewage substantially within a predetermined zone of electrode potential which is less than the electrode potential of chlorine-treated sewage containing free chlorine but which is indicative of the absence of the aforesaid undesired compounds.

4. A process of treating sewage, which process comprises adding a halogen to the sewage to remove undesired characteristics thereof, detecting the electrode potential of the sewage as against a standard potential, and varying the supply of halogen when and as needed and in such quantity that the sewage will be held to a predetermined potential below that obtainable if free chlorine were present, and within the range minus 150 millivolts and plus 400 millivolts when caused to impinge upon an electrode and the latter is compared to a normal hydrogen electrode.

5. The method of removing undesired sulphide compounds from liquid material which method comprises, in combination, detecting an electrode potential of the liquid material with respect to a reference potential, supplying a halogen to the liquid material when and as needed, and controlling the supply of the halogen to the liquid material to maintain the detected difference of potential below that obtainable if free chlorine were present and above that produced when the undesired sulphide compound is present in objectionable amount.

6. A method of treating aqueous liquid to remove undesirable sulphur compounds susceptible of elimination by addition of a halogen, comprising detecting the electrode potential of the liquid by introducing it to an electrode and comparing the potential of the latter to a standard reference half-cell, supplying a halogen to the liquid at a point in its flow ahead of the detection of electrode potential, whereby effects of the halogen to vary the said potential may be ascertained, and adjusting the supply of the halogen, when and as needed, to maintain the detected electrode potential within a predetermined optimum zone, which zone lies within a range corresponding to a range of minus 150 to plus 400 millivolts which would be determined by comparing a noble metal electrode in the aqueous liquid to a standard calomel electrode corrected for equivalence to the normal hydrogen electrode, and which zone lies substantially below the electrode potential which would be produced by addition of sufficient halogen to afford detection of the halogen, in the treated liquid, by ordinary methods of chemical analysis.

7. The method of removing undesired sulphide compound from liquid material which method comprises, in combination, detecting the difference between the electrode potential of the liquid material and a standard reference potential, adding halogen to the liquid material to remove the undesired sulphide compound, and suppressing the supply of halogen before the detected difference of potential reaches that obtainable when free halogen is present in the liquid material.

8. The method of treating aqueous material to eliminate undesired characteristics thereof susceptible of elimination by addition of a halogen in amount insufficient to leave free halogen in the material, which method comprises in combination, detecting the electrode potential of the treated material with respect to a standard reference potential, and adding a halogen to the material when and as required to maintain the detected potential of the treated material below the minimum potential which would be detected if free chlorine were present in the material but above the maximum potential detected in the material when the undesired characteristic is present.

9. The method of testing aqueous material to determine undesired characteristics thereof susceptible of elimination by addition of a halogen in amount insufficient to leave free halogen in the material, which method comprises in combination, treating the material with a halogen to reduce said characteristics, detecting the electrode potential of the material undergoing treatment with respect to a standard reference potential and translating the detected potential into an indication when said electrode potential departs from a value below the minimum electrode potential which would be detected if free chlorine were present in the material but above the maximum electrode potential detectable in the material when the undesired characteristic is present.

RICHARD POMEROY.